Patented Apr. 21, 1936

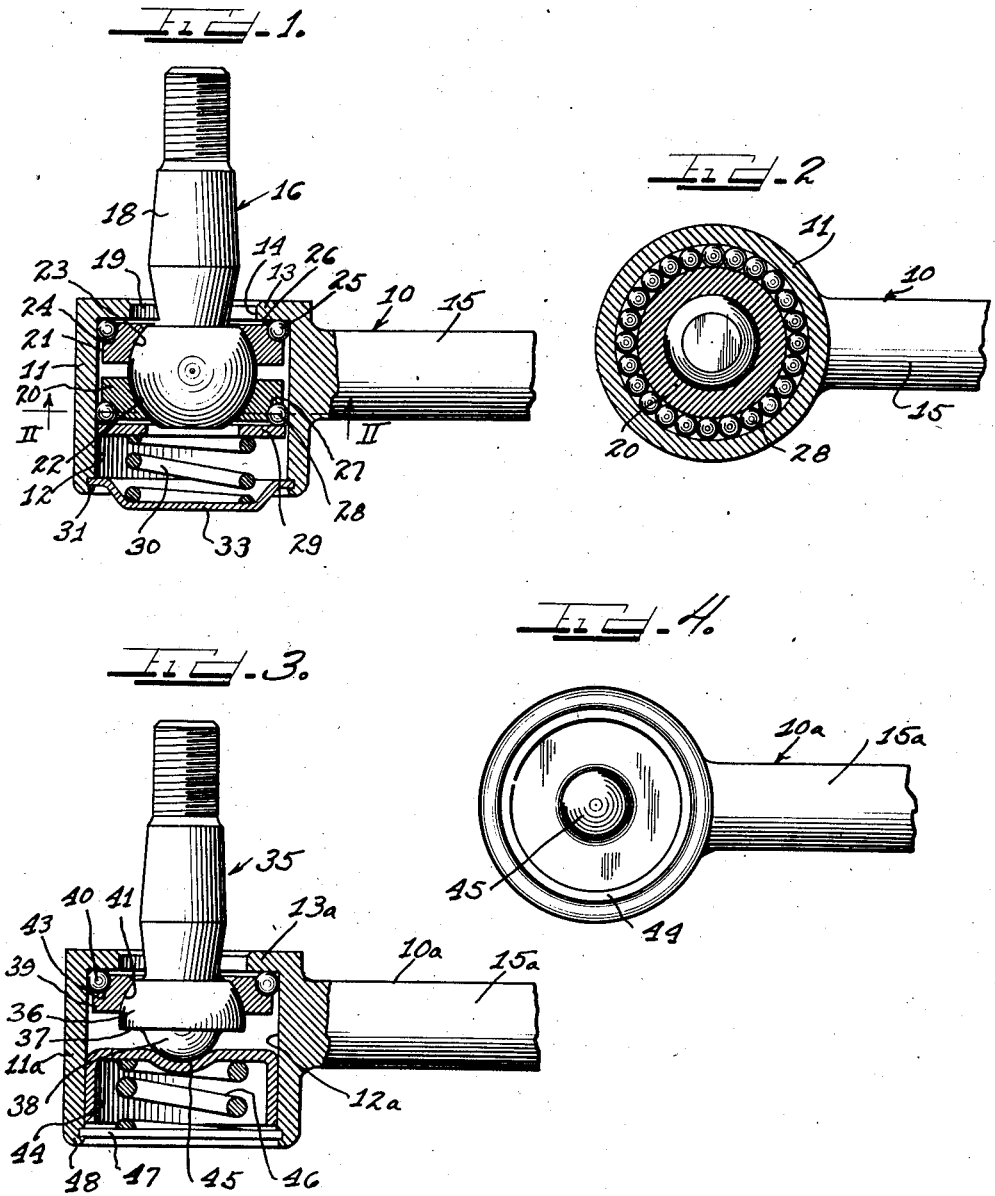

2,037,786

UNITED STATES PATENT OFFICE 2,037,786

JOINT

George H. Hufferd, Detroit, Mich., assignor to Thompson Products Incorporated, Cleveland, Ohio, a corporation of Ohio Application August 30, 1934, Serial No. 742,047

7 Claims. (Cl. 287—90)

This invention relates to a joint and more particularly to a joint adapted for use in drag link and tie rod connections in automatic vehicles.

More specfically this invention relates to joint constructions in which relative rotary movement is provided with a minimum of friction and a limited degree of relative angular movement is also permitted. Ball bearings are used to reduce the frictional resistance to turning movement between the elements of the joint and relative angular movement is acomplished through segmental spherical bearing surfaces.

It is an object of this invention to provide a joint of the class described so constructed as to be particularly suitable for use in the steering mechanism of automotive vehicles having independently mounted or sprung front wheels.

It is a further important object of this invention to provide a joint having independent bearing surfaces for accomplishing relative rotary and angular movement, respectively, between the parts of the joint structure.

It is a further important object of this invention to provide a self-adjusting joint of relatively simple and inexpensive construction and provided with anti-friction elements to permit relative rotary movement between parts of the joint assembly.

Other and further important objects of this invention will be apparent from the disclosures in the specification and the accompanying drawing.

This invention (in a preferred form) is illustrated in the drawing and hereinafter more fully described.

On the drawing:

Figure 1 is a sectional view of a joint embodying the principles of this invention, with parts in elevation.

Figure 2 is a sectional view taken substantially on the line II—II of Fig. 1.

Figure 3 is a sectional view of a modified form of joint construction, with parts in elevation.

Figure 4 is a bottom plan view of the same with parts removed.

As shown on the drawing:

The reference numeral 10 indicates an end member for association with a drag link, tie rod or the like in the usual manner. Although this invention is described in connection with its use in drag links and tie rods, it will be understood that the joint is capable of other application where freedom of relative rotary movement and a limited degree of angular movement are desired.

Said end member 10 includes a socket member 11 having a cylindrical bore 12 extending therethrough. At one end, said socket member 11 is provided with an inturned annular flange 13 defining a restricted opening 14. An integrally formed shank 15 serves for connection between said end member 10 and the body portion of a drag link, tie rod or the like.

A ball stud 16 (Figs. 1 and 2) of conventional form has its ball end 17 positioned within said cylindrical bore 12, the shank 18 of said ball stud extending through the restricted opening 14 with a substantial clearance 19 therebetween to provide for angular movement between the stud and socket member.

A pair of seating elements 20 and 21 having inner segmental spherical surfaces 22 and 23, respectively, are positioned within said cylindrical bore 12 with their inner surfaces in engagement with axially spaced portions of said ball 17. Said seating element 21 is provided with a peripheral groove 24 in the edge thereof adjacent the inner wall of the inturned flange 13. Balls 25 are supported in said groove 24 in bearing relation therewith and also with the cylindrical wall 12 of the bore and the inner walls 26 of the inturned flange 13.

The seating element 20 is similarly provided with a peripheral groove 27 in the edge away from the ball shank. Balls 28 are positioned in said groove 27 in bearing engagement therewith and also in bearing contact with the cylindrical wall 12. A disk or washer 29, freely movable within and closely fitting the bore 12, provides an additional bearing surface for the balls 28. Said disk 29 is constantly urged into engagement with said balls 28 by means of a coiled spring 30 held under compression against said disk 29 by means of a closure member 33. Said closure member 33 is secured in the lower end of the socket member 11, as by spinning the metal of said walls over the edge of the closure disk, as at 31.

In operation, the bearing surfaces 22 and 23, in contact with the segmental spherical surface of the ball 17, provide for limited angular movement between the stud 16 and the end member 10. All relative rotary movement between these two parts of the joint is accomplished through the anti-friction elements 25 and 28 in conjunction with the surfaces against which they bear. This is because the anti-friction elements, or balls 25 and 28, provide less frictional resistance against turning movement than do the segmental spherical surfaces 22 and 23 in contact with the ball 17. Because of the use of separate bearing surfaces for effecting rotary and angular movement, respectively, it is possible to greatly reduce the frictional resistance to relative turning movement without effecting a similar reduction in the frictional resistance to relative angular movement. This is important in the use of joints of this type in steering mechanisms for automotive vehicles having separately mounted or sprung front wheels.

In Figs. 3 and 4, there is shown a similar end member identified by the reference numeral 10a. A stud 35 for association with said end member 10a is provided with a segmental spherical head 36 that constitutes less than one-half of an entire sphere. Said head 36 is provided with a flat base 37 having a segmental spherical boss projecting centrally therefrom.

In the joint shown in Figs. 3 and 4, only a single seating element 39 and set of balls 40 are provided. Said seating element 39 has an inner segmental spherical surface 41 for engagement with the segmental spherical surface of the head 36. The balls 40 are mounted in a peripheral groove 43 and bear against the inner walls of the socket member 11a and inturned flange 13a.

A dished plate 44, freely movable within the socket 12a has a centrally depressed portion 45 for bearing engagement with said boss 38 to permit rocking movement of the stud 35. Said plate 44 is held in bearing engagement with said boss 38 by means of a coiled spring 46 that is held under compression between said disk 44 and a disk closure plate 47. Said closure plate 47 is secured in the open end of the bore 12a by spinning the metal over as at 48.

Relative turning movement between the stud 35 and the end member 10a is effected by the anti-friction elements or balls 40, whereas relative angular movement is accomplished through the segmental spherical bearing surfaces 41 of the annular ring 39 and of the head 37.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint comprising a socket member having a cylindrical bore with an inturned flange at one end defining a restricted opening, a ball end of a ball stud within said bore with the shank thereof freely extending through said restricted opening, a seating element engaging said ball end and provided with a peripheral groove, balls in said groove and bearing against the wall of said bore and also bearing against the inner wall of said inturned flange and means constantly urging the respective bearing surfaces into closer engagement.

2. A joint comprising a socket member having a cylindrical bore with an inturned flange at one end defining a restricted opening, a ball end of a ball stud within said bore with the shank thereof freely extending through said restricted opening, axially spaced annular seating elements engaging said ball end and provided with axially spaced annular peripheral grooves, balls in said grooves and bearing against the wall of said bore, the balls in one groove also bearing against the inner wall of said inturned flange and resilient means constantly urging the respective bearing surfaces into closer engagement.

3. A joint comprising a socket member having a cylindrical bore with an inturned flange at one end defining a restricted opening, a ball end of a ball stud within said bore with the shank thereof freely extending through said restricted opening, axially spaced annular seating elements engaging said ball end and provided with axially spaced annular peripheral grooves, balls in said grooves and bearing against the wall of said bore, the balls in one groove also bearing against the inner wall of said inturned flange, a washer cooperating to provide a bearing surface for the balls in the other groove and resilient means bearing against said washer and constantly urging the respective bearing surfaces into closer engagement.

4. A joint comprising a socket member having a cylindrical bore extending therethrough and having an inturned flange defining a restricted opening at one end of said bore, a spherical head of a stud positioned in said bore with the shank thereof extending freely through said restricted opening, annular seating elements in engagement with axially spaced portions of said head, said elements having peripheral grooves in their opposed outer edges, balls in said grooves bearing against the wall of said bore, one set of balls also bearing against the inner wall of said inturned flange, a disk forming a bearing surface for the other set of balls, a closure member for the large end of said bore and a coiled spring held under compression between said closure member and said disk.

5. A joint comprising a socket member having a cylindrical bore with an inturned flange forming at one end a restricted opening thereinto, a stud having a segmental spherical head positioned within said bore and having a shank extending through said restricted opening, an annular seating element in engagement with said head to provide relative angular movement between said stud and socket member, said seating element having a peripheral groove in its edge adjacent said inturned flange, balls in said groove bearing against the socket wall and inner wall of said flange to permit relative rotary movement between said stud and socket member and means urging the various bearing surfaces into closer engagement.

6. A joint comprising a socket member having a cylindrical bore with an inturned flange forming at one end a restricted opening thereinto, a stud having a segmental spherical head positioned within said bore and having a shank extending through said restricted opening, an annular seating element in engagement with said head to provide relative angular movement between said stud and socket member, said seating element having a peripheral groove in its edge adjacent said inturned flange, balls in said groove bearing against the socket wall and inner wall of said flange to permit relative rotary movement between said stud and socket member, said head having a spherical boss projecting axially therefrom, a member movable axially of said bore and having a depressed surface engaging said boss, a closure member for the unrestricted end of said bore and a coiled spring held under compression between said closure member and movable member to urge said stud axially into closer bearing contact with said annular seating element.

7. A joint comprising a socket housing having a cylindrical inner wall and an inturned flange at one end thereof defining a restricted opening, a ball stud extending freely through said opening with the ball end thereof in the housing, a pair of axially spaced disc-like seating elements in said housing having inner segmental spherical bearing surfaces engaging said ball end on opposite sides of the great circle thereon and outer cylindrical walls spaced from the cylindrical wall of the housing, rounded peripheral grooves in the opposed outer edges of said seating elements, balls in said grooves bearing against the cylindrical wall of the housing, one set of said balls also bearing against the inturned flange, a washer forming a bearing surface for the other set of balls and a spring held under compression bearing against said washer and constantly urging the respective bearing surfaces of the washer and seating elements into closer engagement.

GEORGE H. HUFFERD.